Patented Apr. 24, 1945

2,374,576

UNITED STATES PATENT OFFICE 2,374,576

POLYAMIDES

Merlin Martin Brubaker, Wilmington, Del., assignor to E. I. du Pont de Nemours & Company, Wilmington, Del., a corporation of Delaware No Drawing. Application October 10, 1940,
Serial No. 360,679

7 Claims. (Cl. 260—18)

This invention relates to synthetic polyamides and more particularly to improved products and compositions comprising plasticized polyamides.

The polyamides improved by the practice of this invention are of the general type described in Patents 2,071,250, 2,071,253 and 2,130,948. They are obtained from polymerizable amino carboxylic acids and by reacting diamines with dicarboxylic acids, it being understood that reference to the above mentioned acids includes also their equivalent amide-forming derivatives, which in the case of the amino acids include the lactams and aminonitriles. These polyamides when polymerized to a sufficiently high degree, namely, to an intrinsic viscosity of at least 0.4 (defined in above mentioned Patent 2,130,948) can be formed into filaments capable of being cold drawn into textile fibers showing by characteristic X-ray patterns orientation along the fiber axis. Structurally, the polyamides are long chain, high molecular weight polymers having a plurality of amide or thioamide groups as an integral part of the main chain of atoms in the polymer. The average number of carbon atoms separating the amide groups is at least two. On hydrolysis with strong mineral acids the polyamides revert to monomeric, bifunctional, amide-forming compounds. Thus, a polyamide derived from a diamine and a dibasic carboxylic acid yields, on hydrolysis with hydrochloric acid, a diamine hydrochloride and a dibasic carboxylic acid, whereas a polyamide derived from an amino acid yields a monoaminomonocarboxylic acid hydrochloride.

These polyamides are in general microcrystalline rather than resinous and have high melting points. They can be formed into various useful shaped objects without the use of solvents and plasticizers merely by spinning, extruding, or otherwise forming the object from the molten polyamide. These products are in general improved by cold working which in the case of films for example may consist in either cold drawing or cold rolling or both. The polyamide products thus treated show molecular orientation in the direction of the cold working. They are strong and for some purposes possess adequate pliability.

For many uses, however, better pliability and workability are desired than are obtained in the unmodified polyamide. For this reason, modification of the polyamides with plasticizers is often necessary. Among the properties desired in polyamide compositions modified with plasticizing agents are pliability, freedom from exudation over a wide temperature range, resistance to failure on repeated flexing, and good outdoor durability. Freedom from objectionable odor and embrittlement at low temperature, resistance to leaching by water, and a high softening temperature are also desirable properties. Although some of the above properties can be developed in polyamides through the use of modifying agents heretofore proposed, no compounds are known which will contribute all of the above desired properties. Phenols, including compounds containing two phenolic nuclei attached to a single carbon atom, as for example 2,2-diphenylolpropane, have been suggested as plasticizing agents. Compounds of this kind, however, although possessing the necessary compatability and enhancing the pliability of polyamides at ordinary or elevated temperatures, impart poor flexibility at low temperatures to the polymer because of the high melting solid nature of the plasticizer. Some simple phenols are known to be useful as plasticizers for the polyamides and to impart valuable properties to them. For the most part, however, the simple phenols are crystalline solids or low melting liquids possessing an objectionable phenolic odor. Furthermore, most of the known solvent type modifying agents cause a marked lowering in the melting point of the polyamide when incorporated in large quantities which is a serious disadvantage in many applications.

This invention has as an object new and useful compositions comprising polyamides. A further object resides in plasticized polyamide compositions and products possessing to a high degree the desirable properties previously referred to. A further object is the incorporation with polyamides of plasticizing agents which can be used in large amounts without causing substantial lowering in the melting point of the polyamide. Other objects will appear hereinafter.

I have found that the polyphenols, described more particularly below containing at least 2 hydroxyphenyl nuclei separated by a chain of atoms contiguous with the carbon atoms in the phenyl groups when incorporated with polyamides yield compositions possessing to an exceptionally high degree the desired combination of properties referred to above.

The chain of atoms separating the hydroxyphenyl nuclei will usually contain between 6 and 30 atoms. Preferably it is a polymethylene chain containing from 8 to 20 carbon atoms. The chain may, however, contain oxygen or other atoms.

Examples of suitable polyphenols are 1,10-di(hydroxyphenyl)-decane,

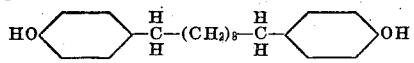

and 1,12 - di - (p-hydroxyphenyl) - octadecane. These phenols are conveniently prepared by reacting the corresponding diol with excess phenol in the presence of a dehydrating agent, such as zinc chloride or sulfuric acid, or a catalyst such as boron trifluoride or hydrogen fluoride. Another preferred class of polyphenols are the phenolated fatty oil derivatives prepared from a phenol and a fatty oil containing unsaturation or free hydroxyl groups, such as glycerol trioleate, castor oil, hydrogenated castor oil, or olive oil. Polyphenols of this type may be illustrated by the following structural formula:

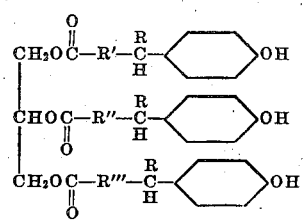

where R is a monovalent aliphatic radical, and R', R" and R'" are divalent aliphatic radicals containing from 1 to 20 carbon atoms.

The polyphenol is usually used in quantities of from 10 to 100%, based on the weight of the polyamide, but larger or smaller amounts, as for instance from 1 to 150%, may be used depending upon the nature of the polyphenol and upon the properties desired in the final product. A convenient method for incorporating the polyphenols consists in dissolving the polyphenol and the polyamide in a mutual solvent. Such solutions can be used in making filaments, films, rods, and the like by evaporative or coagulative methods. Lower fatty acids, e. g. formic acid, are useful solvents for this purpose. Methanolcalcium chloride systems are also conveniently used. Mixtures of chloroform and methanol or ethanol and water are especially useful solvents for the interpolyamides. These polyphenols may also be incorporated in the polyamides by melt blending. Still another method consists in preparing the polyamide in the presence of the polyphenol.

The invention is described more specifically in the following examples in which parts are by weight.

Example I

An interpolyamide is prepared from hexamethylene diammonium adipate and epsilon-aminocapronitrile in a 60:40 ratio. This interpolyamide has a melt viscosity of 6200 poises at 250° C. and melts at 170–175° C.

Ten parts of this interpolyamide is dissolved in 50 parts of a mixture of equal volumes of chloroform and methanol by stirring at 60° C. for two hours. Six and seven-tenths parts of the diphenylol (presumably 1,12-di-(hydroxyphenyl)-octadecane) prepared by heating an excess of phenol with 1,12-octadecanediol in the presence of zinc chloride, is now added to the solution with stirring. The solution is cooled to room temperature and a portion poured onto a glass plate. By means of a leveling blade the solution is spread to an even layer and the solvent allowed to evaporate at room temperature. Final traces of solvent are removed from the film by heating at 65° C. for 15 hours. The composition melts at 152° C. when tested on a copper block in the open air. It has a tensile strength of 1865 lbs./sq. in., based on the original dimensions. Tested on a Schiltknecht flex machine a sample of plasticized film withstands 164,000 flexes before failing. In comparison, a sample of the same interpolyamide plasticized with 2,2-diphenylolpropane using the same ratio of interpolyamide to plasticizer melted at 114–116° C., had a tensile strength of 1100 lbs./sq. in., and failed in 20,000 flexes on a Schiltknecht flex machine.

Example II

An interpolyamide is prepared from hexamethylene diammonium adipate and 12-aminostearic acid in a 40:60 ratio. This interpolyamide has an intrinsic viscosity of 0.98 and melts at 130–134° C.

Ten parts of this interpolymer is dissolved in 45 parts of a mixture of equal volumes of chloroform and methanol by stirring. Two and five-tenths parts of 1,12-di-(hydroxyphenyl)-octadecane is now added to the solution with stirring. The solution is cooled to room temperature and a film cast as described in Example I. It is removed from the glass plate and final traces of solvent removed from the film by seasoning at 65° C. for 15 hours. The film thus prepared melts at 123° C., has an elongation of 388% and a tensile value of 2050 lbs./sq. in., based on original dimensions. A sample of the film withstands 71,000 flexes on the Schiltknecht flex machine before failing. After aging one week at 65° C., the film withstands 476,000 flexes before failing. In contrast, a sample of unplasticized film prepared in a similar manner flexes 4000 times before failing, and after aging one week at 65° C. flexes only 3000 times.

Example III

An interpolyamide is prepared from hexamethylene diammonium adipate and epsilon-aminocapronitrile in a 60:40 ratio. This interpolyamide has a melt viscosity of 480 poises at 250° C. and melts at 170–175° C.

Ten parts of this interpolyamide is dissolved in 50 parts of 3:2 mixture (by volume) of chloroform and methanol by stirring at 60° C. for two hours. Four and seven-tenths parts of 1,12-di-(hydroxyphenyl)-octadecane is added with stirring, the solution cooled to room temperature, and a film cast as in Example 1. A clear, pliable, strong film is obtained which melts at 160–163° C. and shows an elongation of 300%. Tensile value, based on the original dimensions of the film, is 2800 lbs./sq. in.

Example IV

An interpolyamide is prepared from hexamethylene diammonium adipate and caprolactam in a 60:40 ratio. This interpolyamide has a melt viscosity of 1926 poises at 250° C. and melts at 170–175° C.

Twenty-three parts of castor oil and 11 parts of propylene glycol are heated for 0.5–1 hour at 180° C. in the presence of a small amount of sodium hydroxide, causing the glycerol in the fatty oil to interchange with propylene glycol to such an extent that a mixture of partially esterified glycerol and propylene glycol esters results. Traces of propylene glycol and glycerol which are completely unesterified are removed by washing with water.

One thousand three hundred seventy-eight parts of this interpolymer, 1028 parts of 1,12-di-(hydroxyphenyl)-octadecane, and 341 parts of the propylene glycol-castor oil interchange product mentioned above are dissolved in 3070 parts of 95% ethanol and 1032 parts of water by heating with stirring under reflux at 65–70° C. for about twelve hours. The resultant composition will be designated as Composition A.

A second solution is prepared by dissolving 4630 parts of the same interpolyamide and 2422 parts of 1,12-di-(hydroxyphenyl)-octadecane in a solvent mixture consisting of 10,200 parts of 95% ethyl alcohol and 3370 parts of water by stirring and warming under reflux at 65–70° C. for about twelve hours. A mixture of 1110 parts of the propylene glycol-castor oil interchange product described above, 182 parts of carbon black, and 918 parts of 1,12-di-(hydroxyphenyl)-octadecane are added to the solution and heating and stirring continued for an additional seven hours. The resultant composition will be designated as Composition B.

An anchor coat is applied by spreading two coats of Composition A over black sateen fabric, each coat being followed by drying at 190° F. Six coats of Composition B are then applied, each coat again being dried at 190° F. The coated fabric is skivered on a standard skiver roll and eight more coats of Composition B applied. The coating weight is 8.8 oz./50" yard. The coated fabric has an especially attractive surface closely resembling that of finished leather. The material flexes 2,590,000 times on the Schiltknecht flex machine before failing. In comparison, a sample of sateen coated in a similar manner with unplasticized polymer containing 9.3 oz. of coating per 50" yard fails after 10,000 flexes. The plasticized sample gives a scrub value of 4600 (scrub test described in Automotive Industries, 49, 1262–6).

EXAMPLE V

An interpolyamide is prepared from hexamethylene diammonium adipate, caprolactam, and decamethylene diammonium adipate in a 40:30:30 ratio. This interpolyamide has an intrinsic viscosity of 1.20, a melt viscosity of about 13,000 poises at 250° C., and melts at 160° C.

From the interpolyamide the following compositions are prepared:

*Composition A*

| | Parts |
|---|---|
| Interpolyamide | 1770 |
| 1,12-di-(hydroxyphenyl)-octadecane | 708 |
| Butyl phthalyl butyl glycolate | 472 |
| 95% ethanol | 4220 |
| Water | 594 |

*Composition B*

| | Parts |
|---|---|
| Interpolyamide | 7630 |
| 1,12-di-(hydroxyphenyl)-octadecane | 3045 |
| Butyl phthalyl butyl glycolate | 2038 |
| 95% ethanol | 18550 |
| Carbon black | 272 |
| Water | 2530 |

Two coats of Composition A are applied to a black sateen fabric (1.32-52" high count) each coat being dried at 190° F. Four coats of Composition B are then applied, each coat being again dried at 190° F. The coated fabric is skivered on a standard skiver roll at 160–170° F. and then nine additional coats of Composition B are applied to give a coating weight of 10.5 oz./50" yard. The coating is then washed with a mixture of ethanol, methyl cellosolve, and water in a 50:30:20 ratio. The resultant coated fabric has an exceptionally attractive surface closely resembling that of finished leather. It withstands 2,517,000 flexes in a Schiltknecht flex machine before failing, and has a scrub value of 20,025.

EXAMPLE VI

Ten parts of the interpolymer described in Example I and 8.2 parts of the product prepared by condensing hydrogenated castor oil with phenol in the presence of a boron trifluoride catalyst are dissolved in 57 parts of a mixture of equal volumes of chloroform and methanol by stirring at 50° for two hours. A film prepared as in Example I melts at 172–174° C., exhibits a tensile value of 1,490 lbs./sq. in., based on the original dimensions, and an elongation of 236%. The film is not cracked when dealt a severe blow at temperatures as low as 0° F. In comparison a portion of the unplasticized polymer cracked when subjected to a similar blow at +15° F.

EXAMPLE VII

Ten parts of the interpolymer described in Example I and 8.2 parts of the product prepared by condensing castor oil and phenol in the presence of zinc chloride are dissolved in 57 parts of a mixture of equal volumes of chloroform and methanol by stirring for two hours at 60° C. A film prepared as in Example I is clear, pliable, soft, and dry and melts at 172–174° C. It exhibits a tensile value of 1800 lbs./sq. in. and an elongation of 290%.

EXAMPLE VIII

Seven parts of polyhexamethylene adipamide with melt viscosity of 460 poises at 285° C. and 3 parts of 1,12-di-(hydroxyphenyl)-octadecane are heated with stirring for 40 minutes at 285° in an atmosphere of nitrogen. A clear, viscous, homogeneous melt results. On cooling a portion of the plasticized composition is molded between steel plates at 250° C. to a clear, transparent, flexible film which exhibits a tensile value of 2530 lbs./sq. in.

EXAMPLE IX

A 1.48-40" sateen was coated with a composition comprising 49% of the interpolyamide mentioned in Example IV, 36.75% 1,12-di-(hydroxyphenyl)-octadecane, 12.25% of the propylene glycol-castor oil interchange product mentioned in Example IV, and 2% carbon black. The weight of coating applied was 8.8 oz./50" yard. A sample of the coated fabric was soaked for one hour at room temperature in 37% of formalin containing 0.01% sodium hydroxide, allowed to dry at room temperature for 16 hours, and then thoroughly rinsed with warm water. The formaldehyde treatment was found to improve the alcohol resistance of the coating. Thus when 1 cc. of 50% aqueous ethanol was allowed to evaporate from the coating the appearance of the sample was unchanged. In contrast, a similar sample of polyamide-coated fabric which had not been subjected to the formaldehyde treatment was whitened and permanently scarred when similarly treated with 50% aqueous ethanol.

As additional examples of polyamides which may be plasticized by the practice of this invention may be mentioned polytetramethylene adipamide, polyhexamethylene sebacamide, polydecamethylene adipamide, poly-m-phenylene sebacamide, polymerized 6-aminocaproic acid, and the interpolyamide derived from hexamethylene diammonium adipate and decamethylene diammonium sebacate.

Instead of the polyamides mentioned above which are obtained from bifunctional polyamide reactants as essentially sole reactants, I may use polyamides obtained by including with the polyamide-forming reactants used to prepare the polyamides other bifunctional reactants, such as glycols, hydroxy acids, and amino alcohols. As examples of such modified polyamides may be mentioned those derived from diamines, dibasic acis and glycols; those derived from diamines, dibasic acids and aminoalcohols; and those derived from aminoacids, glycols and dibasic acids. Although these polymers contain ester linkages they can still be referred to as polyamides since they contain a plurality of amide linkages and retain many of the desirable properties of the straight polyamides. As in the case of the straight polyamides, these modified polyamides should preferably have an intrinsic viscosity above 0.4. It is within the scope of the invention to use polyamides and polyester-amides which have been reacted with a diisocyanate or diisothiocyanate to increase their molecular weight.

Additional examples of polyphenols which can be used in making the compositions of this invention include 1,6-di-(hydroxyphenyl)-hexane, 1,8-di-(hydroxyphenyl)-octane, 2,8-di-(hydroxyphenyl)-nonane, 2,10-di-(hydroxyphenyl)-undecane, 1,10-di-(hydroxyphenyl)-decane, 1,6-di-(hydroxyphenyl)-octadecane, 2,10-di-(hydroxyphenyl)-octadecane, 1,11-di-(hydroxyphenyl)-octadecane, 2,11-di-(hydroxyphenyl)-octadecane, 2,12-di-(hydroxyphenyl)-octadecane, 2,12-di-(hydroxyphenyl)-tridecane, 2,11-di-(hydroxyphenyl)-docosane, 2,15-di-(hydroxyphenyl)-hexadecane, 2,13-di-(hydroxyphenyl)-docosane, 1,8-di-(amylhydroxyphenyl)-octane, 2,9-di-(butylhydroxyphenyl)-octadecane, 1,10-di-(ethylhydroxyphenyl)-octadecane, 2,11-di-(amylhydroxyphenyl)-octadecane, 2,12-di-(hydroxytolyl)-octadecane, and bis (beta-[4 hydroxyphenyl]-1,4-diethylbenzene).

Phenolated fatty acid esters have also been found especially useful. The phenylol group may be conveniently introduced into a fatty acid ester either by addition to a double bond or by replacement of a hydroxyl group. Among the materials which may be phenolated to yield derivatives of this general type are castor oil, olive oil, cottonseed oil, perilla oil, soya bean oil, linseed oil, China-wood oil, tung oil, spermaceti, wool wax, peanut oil, and rapeseed oil. The esters of any polyhydroxy alcohol, as well as the natural occurring esters may be used. Phenol is the preferred phenol to be used for phenolation, but others such as cresol, xylenol, butyl phenol, amylphenol, and diamyl phenol may also be used.

The plasticizing effect of the polyphenols is increased by the presence of a small amount of water. Other non-solvents containing alcoholic hydroxyl groups, particularly alcohols such as methanol, propanol, isobutanol, benzyl alcohol, cyclohexanol, hexamethylene glycol, and glycerol have a similar effect. Moreover, there may be associated with the polyamide-polyphenol compositions other types of plasticizers such as dibutyl phthalate, tricresyl phosphate, monomeric amides boiling over 220° C., cycloketones in which a carbonyl group forms a part of the ring structure, and sulfonamides, especially alkylaryl sulfonamides such as amylbenzenesulfonamide. Particularly effective plasticizing compositions are obtained by using the polyphenols in conjunction with esters of dibasic carboxylic acids in which at least one of the carboxyl groups is esterified by an hydroxymonocarboxylic acid ester, e. g., amyl phthalyl amyl glycolate.

The compositions of this invention may also contain other types of modifying agents such as luster modifying agents, pigments, fillers, dyes, antioxidants, metal deactivators, oils, and cellulose derivatives.

The polyamide compositions described herein are particularly valuable because the present phenolic compounds, even when incorporated in large amounts, cause but relatively small lowering of the melting point of the composition. On the other hand, most of the modifying agents which are compatible with polyamides cause a marked lowering in the melting point. The present compositions are, therefore, especially useful in such applications as coated fabrics, transparent wrapping foil, molded articles, and the like. The polyamide products of this invention in addition to high softening temperatures are characterized by high flexibility at low as well as at high temperatures, freedom from objectionable odor and from exudation, good durability upon outside exposure, and resistance to leaching by water. A surprising characteristic of products prepared from the compositions of this invention is that their flexibility is enhanced by heating at moderately elevated temperatures. Most plasticized compositions show a decrease in resistance to flexing after being heated.

Typical applications of the products of this invention are in yarns, fabrics, bristles, surgical sutures, fishing leaders, fishlines, dental floss, rods, tubes, films, ribbons, sheets, safety-glass interlayers, molded articles, golf ball covers, adhesives, electrical insulation (e. g, for wires), impregnating agents, and coating compositions (e. g. for cloth, paper, leather, metal, and wood). The present compositions are useful for impregnating cloth followed by calendering or pressing for use as collar interliners. These plasticized polyamides, as has been previously mentioned, are particularly advantageous in that they possess a high pliability over a wide range of temperatures and exceptional resistance to failure on repeated flexing. These properties are most important in connection with the use of the product in sheet form. Products of this kind are wrapping foils, leather applications, raincoats, shower curtains, and umbrellas. By reason of the fact that polyamide-polyphenol compositions may be melted and thus extruded they can be formed into tubing or coated directly onto fabric and metals. The compositions are also useful in the preparation of cans, tumblers, drinking cups, jars, dishes, bottles, bottle caps, flasks, vases, trays, boxes, cartons, cigar slip covers ammunition cases, and other containers, and in the preparation of blown articles such as toys, containers, bags, hollow toiletware, etc. Furthermore, they may be compression molded; for example, blanked or stamped out into shaped articles.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a linear polyamide and a phenol containing hydroxylphenyl nuclei, said phenol being selected from the group consisting of (a) phenols containing two hydroxyl phenyl nuclei separated by a polymethylene chain of from 8 to 20 carbon atoms (b) phenolated fatty oils containing three hydroxyphenyl groups per glyceride molecule, and (c) phenolated hydrogenated castor oil containing three hydroxyphenyl groups per glyceride molecule, said polyamide being the reaction product of a polymer-forming composition which comprises reacting material selected from at least one of the groups consisting of (a) monoamino-monocarboxylic acids, and (b) mixtures of diamine with dibasic carboxylic acid.

2. The composition set forth in claim 1 in which said phenol contains two hydroxyphenyl nuclei separated by a polymethylene chain of from 8 to 20 carbon atoms.

3. The composition set forth in claim 1 in which said phenol is phenolated castor oil containing three hydroxyphenyl groups per glyceride molecule and obtained by condensing a phenol with castor oil.

4. The composition set forth in claim 1 in which said phenol is 1,12-di(hydroxyphenyl)-octadecane.

5. The composition set forth in claim 1 in which said polyamide is polyhexamethylene adipamide.

6. The composition set forth in claim 1 in which said polyamide is an interpolyamide.

7. The composition set forth in claim 1 in which said polyamide is a hexamethylenediamine-adipic acid-caprolactam interpolyamide.

MERLIN MARTIN BRUBAKER.